United States Patent
Dong et al.

(10) Patent No.: US 10,521,362 B2
(45) Date of Patent: Dec. 31, 2019

(54) METHOD AND DEVICE FOR STORAGE MANAGEMENT

(71) Applicant: EMC IP Holding Company LLC, Hopkinton, MA (US)

(72) Inventors: Jibing Dong, Beijing (CN); Geng Han, Beijing (CN); Jian Gao, Beijing (CN); Jamin Jianbin Kang, Beijing (CN); Hongpo Gao, Beijing (CN); Huadong Li, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 37 days.

(21) Appl. No.: 15/628,862

(22) Filed: Jun. 21, 2017

(65) Prior Publication Data
US 2017/0364456 A1 Dec. 21, 2017

(30) Foreign Application Priority Data
Jun. 21, 2016 (CN) .......................... 2016 1 0454617

(51) Int. Cl.
| G06F 12/16 | (2006.01) |
| G06F 3/06 | (2006.01) |
| G06F 11/14 | (2006.01) |
| G06F 11/07 | (2006.01) |

(52) U.S. Cl.
CPC ............ *G06F 12/16* (2013.01); *G06F 3/0604* (2013.01); *G06F 3/0607* (2013.01); *G06F 3/0644* (2013.01); *G06F 3/0671* (2013.01); *G06F 11/1448* (2013.01); *G06F 11/1458* (2013.01); *G06F 3/0619* (2013.01); *G06F 11/0727* (2013.01); *G06F 11/0751* (2013.01); *G06F 11/1469* (2013.01)

(58) Field of Classification Search
CPC .... G06F 12/16; G06F 11/1458; G06F 3/0607; G06F 11/1448; G06F 11/1469
See application file for complete search history.

(56) References Cited

U.S. PATENT DOCUMENTS

| 8,825,653 B1 | 9/2014 | Wang et al. |
| 9,083,510 B1 | 7/2015 | Lakshman et al. |
| 9,286,219 B1 | 3/2016 | Derbeko et al. |
| 9,703,644 B1 | 7/2017 | Jagannatha et al. |
| 9,817,832 B1* | 11/2017 | Protopopov ........ H04L 67/1095 |
| 10,089,012 B1* | 10/2018 | Chen .................. G06F 3/061 |
| 2003/0115282 A1* | 6/2003 | Rose .................. H04L 29/06 709/214 |

(Continued)

*Primary Examiner* — Francisco A Grullon
(74) *Attorney, Agent, or Firm* — Bainwood, Huang & Associates, LLC

(57) ABSTRACT

Embodiments of the present disclosure provide a method and device for storage management. The method comprises receiving at a storage management device a configuration request for a storage space managed by the storage management device, the configuration request indicating a capacity of the storage space and a target size of a chunk in the storage space; and based on the capacity and the target size, dividing the storage space into a metadata region storing a chunk status indicator indicating whether the chunk is assigned with data and a data region including the chunk with the target size. Embodiments of the present disclosure also provide a corresponding device.

17 Claims, 14 Drawing Sheets

(56) References Cited

U.S. PATENT DOCUMENTS

| | | | | |
|---|---|---|---|---|
| 2004/0221102 A1* | 11/2004 | Watanabe | ............ | G06F 3/0611 |
| | | | | 711/112 |
| 2006/0294125 A1* | 12/2006 | Deaven | ................ | H04N 19/46 |
| 2011/0078405 A1* | 3/2011 | Asano | .................. | G06F 3/0607 |
| | | | | 711/170 |
| 2017/0004069 A1* | 1/2017 | Li | .......................... | G06F 12/08 |

* cited by examiner

US 10,521,362 B2

METHOD AND DEVICE FOR STORAGE MANAGEMENT

RELATED APPLICATIONS

This application claim priority from Chinese Patent Application Number CN201610454617.X, filed on Jun. 21, 2016 at the State Intellectual Property Office, China, titled "METHOD AND DEVICE OF STORAGE MANAGEMENT" the contents of which is herein incorporated by reference in its entirety.

FIELD

Embodiments of the present disclosure generally relate to the technical field of data storage, and more specifically, to a method and device for storage management.

BACKGROUND

To meet customers' requirements for optimizing and managing storage devices, e.g., various physical devices for storage, such as disks, storage device vendors usually provide some operation commands used for managing the physical storage devices. However, different storage device vendors may adopt different operation behaviors for those operation commands, even for those used to implement a same function, which brings customers inconsistent operational view towards the products provided by different storage device vendors. It may even cause unexpected wrongful handling of data and severely impact customers' experience and the accuracy requirement for data processing.

SUMMARY

In general, embodiments of the present disclosure provide a solution for optimizing storage management by improving data storage architecture of a storage device.

According to one aspect of the present disclosure, there is provided a method for storage management. The method comprises: receiving, at a storage management device, a configuration request for a storage space managed by the storage management device, the configuration request indicating a capacity of the storage space and a target size of a chunk in the storage space; and based on the capacity and the target size, dividing the storage space into a metadata region storing a chunk status indicator indicating whether the chunk is assigned with data and a data region including the chunk with the target size.

In some embodiments, the method further comprises: dividing chunks in the storage space into a plurality of clusters; determining, for one of the plurality of clusters, a cluster status indicator indicating whether the cluster is assigned with data based on chunk status indicators of chunks in the cluster; and storing the cluster status indicator in a volatile memory of the storage management device.

In some embodiments, the method further comprises: receiving, at the storage management device, a read request involving at least one of the plurality of clusters; and processing the read request based on a cluster status indicator of the at least one cluster involved in the read request.

In some embodiments, the at least one cluster includes a first cluster, and the processing the read request comprises: obtaining a cluster status indicator of the first cluster involved in the read request; and in response to the cluster status indicator of the first cluster indicating that the first cluster is assigned with data, retrieving data stored in the first cluster associated with the read request.

In some embodiments, the at least one cluster includes a second cluster, and the processing the read request comprises: obtaining a cluster status indicator of the second cluster involved in the read request; and in response to the cluster status indicator of the second cluster indicating that the second cluster is not assigned with data, returning a predetermined response for the, read request.

In some embodiments, the at least one cluster includes a third cluster, and the processing the read request comprises: obtaining a cluster status indicator of the third cluster involved in the read request; in response to the cluster status indicator of the third cluster indicating that a status of the third cluster is unknown, obtaining chunk status indicators of chunks in the third cluster; and processing the read request based on the obtained chunk status indicators.

In some embodiments, the processing the read request based on the obtained chunk status indicators comprises: in response to a chunk status indicator of a first chunk in the third cluster indicating that the first chunk is assigned with data, retrieving data stored in the first chunk associated with the read request; and in response to a chunk status indicator of a second chunk in the third cluster indicating that the second chunk is not assigned with data, returning a predetermined response for the read request.

In some embodiments, the method further comprises: receiving, at the storage management device, a write request involving at least one of the plurality of clusters; and; and processing the write request based on a cluster status indicator of the at least one cluster involved in the write request.

In some embodiments, the at least one cluster includes a fourth cluster, and the processing the write request comprises: obtaining a cluster status indicator of the fourth cluster involved in the write request; and in response to the cluster status indicator of the fourth cluster indicating that the fourth cluster is assigned with data, writing data associated with the write request to the fourth cluster.

In some embodiments, the at least one cluster includes a fifth cluster, and the processing the write request comprises: obtaining a cluster status indicator of the fifth cluster involved in the write request; in response to the cluster status indicator of the fifth cluster indicating that the fifth cluster is not assigned with data, writing data associated with the write request to at least one chunk in the fifth cluster; and updating the cluster status indicator of the fifth cluster and a chunk status indicator of the at least one chunk in the fifth cluster.

In some embodiments, the writing data to at least one chunk in the fifth cluster comprises: in response to determining that the at least one chunk includes a chunk to be partially used by the write request, writing predetermined filling data to a portion that is not to be used in the chunk by the write request.

In some embodiments, the at least one cluster includes a sixth cluster, and the processing the write request comprises: obtaining a cluster status indication of the sixth cluster involved in the write request; in response to the cluster status indicator of the sixth cluster indicating that a status of the sixth cluster is unknown, obtaining chunk status indicators of chunks in the sixth cluster; and processing the write request based on the chunk status indicators of the chunks in the sixth cluster.

In some embodiments, the processing the write request based on the chunk status indicators of the chunks in the sixth cluster comprises: in response to a chunk status indicator of a third chunk in the sixth cluster indicating that the third chunk is assigned with data, writing data associated with the write request to the third chunk; and in response to the chunk status indicator of a fourth chunk in the sixth cluster indicating that the fourth chunk is not assigned with data, writing data associated with the write request to the fourth chunk and updating the chunk status indicator of the fourth chunk and the cluster status indicator of the sixth cluster.

In some embodiments, the writing data to the fourth chunk comprises: in response to determining that the fourth chunk is to be only partially used by the write request writing predetermined filling data to a portion that is not to be used in the fourth chunk by the write request.

In some embodiments, the method further comprises: receiving at the storage management device a storage release request; and in response to determining that the storage release request is to release only a portion of a fifth chunk in the plurality of chunks, overriding data associated with the release request in the fifth chunk with predetermined to filling data.

In some embodiments, the method further comprises: receiving at the storage management device a storage release request; in response to determining that the storage release request is to release only a part of the chunks in a seventh cluster of the plurality of the clusters, obtaining a cluster status indicator of the seventh cluster; and in response to the status indicator of the seventh cluster indicating that the seventh cluster is assigned with data, updating the cluster status indicator of the seventh cluster.

According to a second aspect of the present disclosure, there is provided an electronic device, comprising: a processing unit; a memory having computer program commands stored therein, the commands, when executed by the processing unit, causing the electronic device to at least implement actions comprising: receiving, at a storage management device, a configuration request for a storage space managed by the storage management device, the configuration request indicating a capacity of the storage space and a target size of a chunk in the storage space; and based on the capacity and the target size, dividing the storage space into a metadata region storing a chunk status indicator indicating whether the chunk is assigned with data and a data region including the chunk with the target size.

According to a third aspect of the present disclosure, there is provided a storage management system, comprising: a receiving unit configured to receive a configuration request for a storage space managed by the storage management device, the configuration request indicating a capacity of the storage space and a target size of a chunk in the storage space; and a configuration unit configured to divide, based on the capacity and the target size, the storage space into a metadata region storing a chunk status indicator indicating whether the chunk is assigned with data and a data region including the chunk with the target size.

According to a fourth aspect of the present disclosure, there is provided a storage management system, comprising a storage management device provided according to the second aspect of the present disclosure and at least one physical storage device for storing data and forming a storage space.

According to a fifth aspect of the present disclosure, there is provided a computer-readable storage medium storing computer-readable program instructions which, when loaded into an apparatus, cause the apparatus to perform the methods provided to according to the first aspect of the present disclosure.

BRIEF DESCRIPTION OF THE DRAWINGS

Through the following detailed description with reference to the accompanying drawings, the above and other features, advantages and aspects of embodiments of the present disclosure will become apparent. In the drawings, identical or similar elements will be represented by identical or similar drawing signs, in which.

DETAILED DESCRIPTION OF EMBODIMENTS

Figure 1:
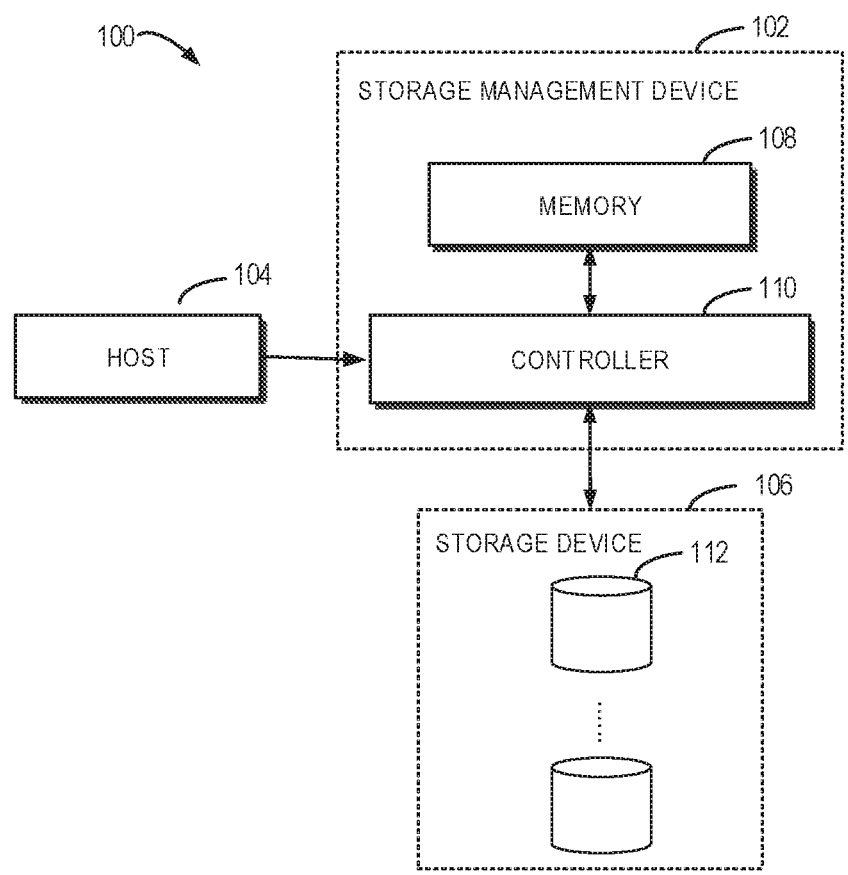
FIG. 1 illustrates a schematic diagram of a storage environment in which embodiments of the present disclosure are applied.

Embodiments of the present disclosure now will be described in details with reference to the drawings. It should be noted that similar components or function assembly in the drawings may be indicated by the same reference sign. The drawings merely serve to explain embodiments of the present disclosure. Those skilled in the art can obtain alternative implementations from the following description without deviating from the spirit and protection scope of the present disclosure.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least one further embodiment".

FIG. 1 illustrates a schematic diagram of a storage environment 100 in which embodiments of the present disclosure are applied. As shown in FIG. 1, the storage environment 100 comprises a storage management device 102, at least one host 104 and a storage device 106. The host 104 can be any appropriate electronic device and may enable operations, such as storing, accessing and processing, on the data in the storage device 106 through the storage management device 102. The storage device 106 may comprise one or more physical storage devices 112, examples of which include, but not limited to, a Solid State Disk (SSD), Fiber Channel (FC) disk, Serial Advanced Technology Attachment (SATA) disk, and Serial Attached Small Computer System Interface (SAS) disk etc. In some embodiments, the storage device 106 may be configured as Redundant Array of Independent Disks (RAID).

The storage management device 102 manages the storage environment 100 and can comprise at least one memory 108, at least one controller 110 and/or other components. In some embodiments, the memory 108 includes volatile and non-volatile memory. The storage management device 104 can configure and manage the physical storage devices 112 in the storage device 106 and implement various processing and applications of the data based on the needs of the host 104.

As mentioned above, vendors of the physical storage device 112 provide operations for optimizing and managing their own manufactured physical storage devices 112, via Advanced Technology Attachment (ATA) command set or Small Computer System Interface (SCSI) command set for instance. However, for the commands implementing a same function, after the storage management device 102 issues commands to the physical storage device 112, operation behaviors on the commands provided by different device vendors command vary. For example, the UNMAP command (known as "TRIM" command in ATA command set and "UNMAP" command in SCSI command set) is designed to enable the storage management device 102 to notify the physical storage device 112 which of the storage regions no longer contain valid data. It may be the host 104 or the storage management device 102 itself determines that certain data is no longer in need, e.g., in response to a deletion operation of the data. The storage management device 102 marks the storage region of the data as available for assigning to new data, and sends an UNMAP command to the physical storage device 112 to inform that the storage region no longer contains valid data, which means the storage region can be released. However, implementations provided by different device vendors fir the UNMAP command are different. This situation will be elaborated with reference to a specific example.

Assuming that a plurality of disks form a common used RAID group of RAID 5, the RAID group is divided into a plurality of stripes, each of which being distributed with corresponding parity data. When the UNMAP operation is performed on the storage region of a certain disk (e.g., disk 4), data on the corresponding stripe(s) is considered as invalid. In some cases, data of the stripe(s), including data of the stripe(s) in disk 4, should be read again. For example, assuming that disk 2 of the RAID group encounters a failure, it is required to read data of the stripe(s) in other disks to reconstruct data in disk 2. When data of the stripe(s) in disk 4 is read, it is expected to return zero filled data or some predefined data. However, for the storage region after being performed by the UNMAP operation, some of the vendors of disk 4 may return zero filled data, while some may return junk data (dirty data) and some may report an error etc., which results in unexpected data processing error.

Figure 2:
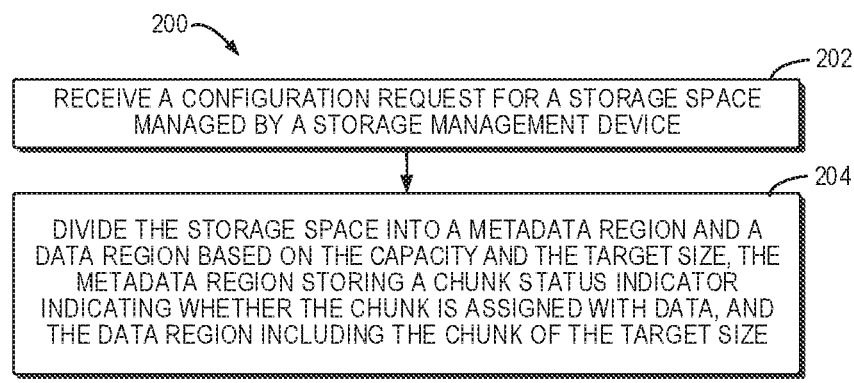
FIG. 2 demonstrates a flowchart of a storage management method according to embodiments of the present disclosure.

To solve the above and other potential problems, embodiments of the present disclosure provide a solution for optimizing storage management by improving data storage architecture of the storage device. FIG. 2 demonstrates a flowchart of a storage management method 200 according to embodiments of the present disclosure. The method 200 shown in FIG. 2 can be executed by, for example, the storage management device 102 illustrated in FIG. 1.

At 202, a configuration request for a storage space managed by the storage management device is received at a storage management device. The configuration request indicates a capacity of the storage space and a target size of a chunk to be divided. In other words, the management user may determine an expected size (i.e., the target size) of a chunk into which the storage space is expected to be divided, depending on the requirements of the storage application. The configuration request received by the storage management device 102 indicates the capacity of the storage space and the target size of a chunk to be divided.

Next, at 204, based on the capacity of the storage space and the target size of a chunk, the storage space is divided into a metadata region and a data region. The metadata region stores chunk status indicators each indicating whether data is assigned to the chunks (also referred to being mapped, i.e., there is a mapping between data and the chunk) or not (also referred to being unmapped), and a data region consisting of chunks with the target size. That is, at 204, the storage space of the physical storage device 112 is divided into two portions, i.e., a data region for storing various data information and consisting of chunks with target size and a metadata region for storing a status indicator of each chunk, which status indicator indicates whether the storage space of the chunk is assigned to be used by valid data or not.

Figure 3:
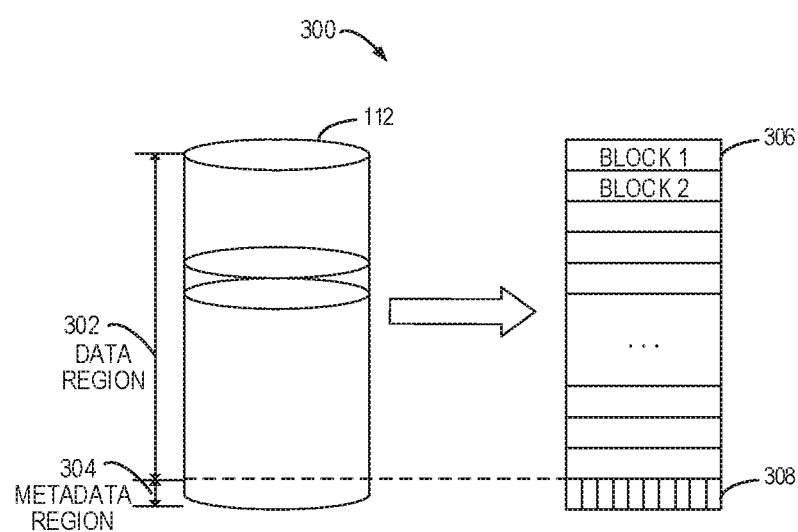
FIG. 3 illustrates a schematic diagram of configuring a physical storage device.
Figure 4:
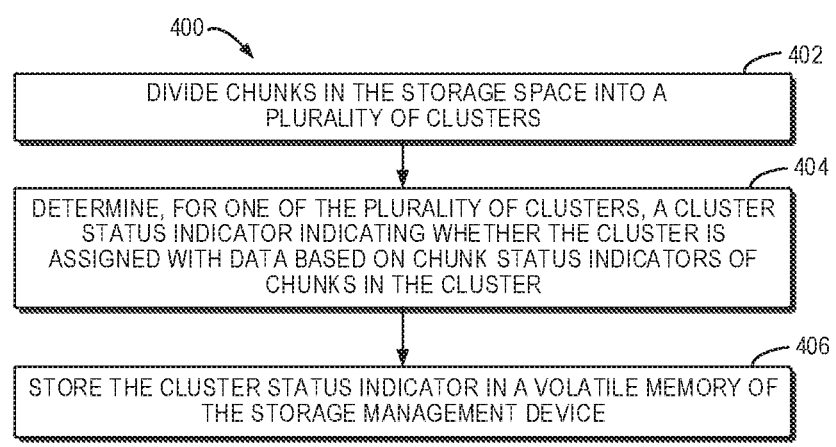
FIG. 4 demonstrates a flowchart of a storage management method according to a further embodiment of the present disclosure.

In order to more clearly describe the process of the above storage management method 200, FIG. 3 gives a further explanation. Assuming that the capacity of the physical storage device 112 of SSD disk is 1 TB, the storage management device 102 divides the storage space of the physical storage device 112 into a data region 302 and a metadata region 304 as illustrated in FIG. 3. The data region 302 is divided into a plurality of chunks 306. The size of each chunk 306 is determined on the basis of the requirements for storage application, e.g., it may vary from 4 KB to 1 MB or be of any other suitable target size. Also, all chunks may even have different sizes. The metadata region is arranged at one end of the physical storage device 112, e.g., the end of the memory maximum address. The metadata region stores a status indicator for each chunk in the data region, which can be stored for example in the form a bitmap represented by 308.

In one embodiment of the present disclosure, each chunk has a corresponding bit in the chunk bitmap indicating whether the corresponding chunk is assigned or not, in which:

Chunk status indicator 1, indicating that the storage region in the chunk is unassigned with data and the content in the chunk is no longer valid. If the content in the chunk is to be read, a predefined response should be returned, e.g., all zeroed data.

Chunk status indicator 0, indicating that the storage region in the chunk is assigned with data and the chunk contains valid content. If the content in the chunk is to be read, the data in the physical storage region should be accessed and be read.

In this way, if the capacity of the physical storage device 112 is 1 TB and the target size of a chunk is 1 MB for instance, then the bit map size is 128 KB.

It should be appreciated that using bitmap to represent chunk status is only exemplary, and the chunk status indicator can be any other alternative or additional structure. For example, in some embodiments, the chunk status indicator can be Boolean variable, in which "true" indicates a chunk being assigned with data and "false" represents the chunk not being assigned with data. The scope of the present disclosure is not limited to any specific implementations of the chunk status indicator.

The physical storage device 112 may be configured according to FIG. 2 and FIG. 3, so that read and write operations of data can be performed based on the chunk, status indicators regardless of the different operation behaviors provided by various storage device vendors.

It should be noted that each I/O operation accesses the storage device at least once to obtain the chunk status indicators, so as to be aware of whether data of the corresponding region in the storage device is valid or not. To avoid accessing the storage device every time, the chunk status indicators can be stored in a volatile memory of the storage management device 102 in some embodiments. However, in the present application environment of increasing mass data storage, the storage management device 102 usually needs to manage a large amount of physical storage devices 112 and maintain the chunk status indicators (i.e., the chunk bitmap) of each physical storage device 112 in the volatile memory, which may bring high costs. For this reason, the storage chunks are further aggregated into "clusters" according to some embodiments of the present disclosure, to further enhance storage management efficiency.

At 402, the chunks in the storage space are divided into a plurality of clusters. In this embodiment, chunks of the physical storage device 112 are "aggregated" so as to form a plurality of clusters with each including a plurality of chunks.

Next at 404, based on chunk status indicators, cluster status indicators are determined. Each cluster status indicator indicates the status of the storage region covered by the corresponding cluster. In some embodiments, the cluster status indicator of a cluster may indicate that the cluster is assigned with data, or is not assigned with data, or the assignment status is unknown. Embodiments of this aspect will be described below in details. The above cluster status is only exemplary and other alternative or additional status is also possible.

At 406, the cluster status indicators are stored in the volatile memory of the storage management device. Therefore, for each I/O request it may be determined, based on the cluster status indicator(s), whether the physical storage device should be accessed and which of the regions should be accessed.

Figure 5:
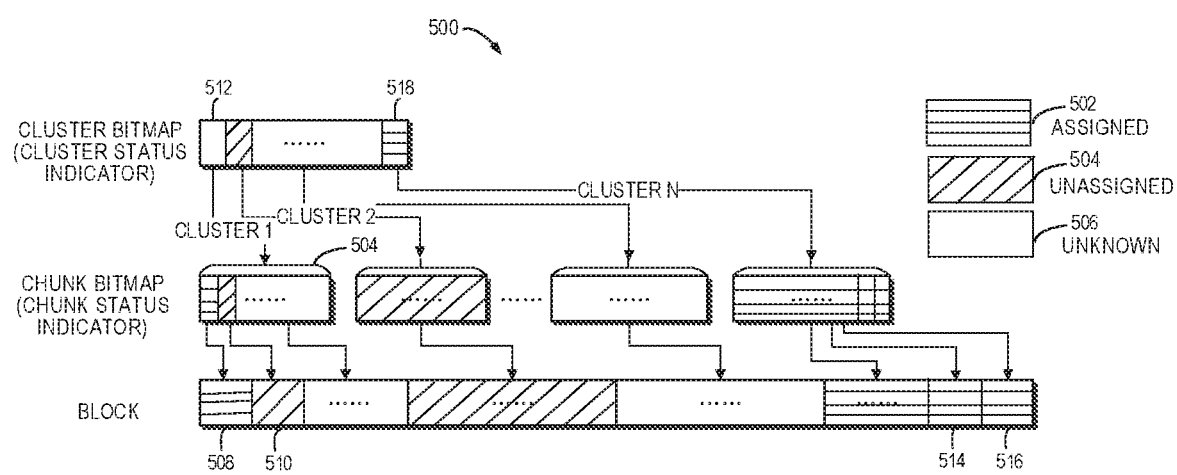
FIG. 5 illustrates a further schematic diagram of configuring a physical storage device.

In order to facilitate understanding the process of the above storage management method 400, FIG. 5 provides further explanations. In the example shown in FIG. 5, a plurality of chunks in the physical storage device 112 are grouped into one cluster. In this way, a plurality of clusters may be formed. Size of each cluster may be determined depending on the needs of storage application. For example, it can be a size of 256 chunks or any other suitable size. Besides, the size of each cluster can be the same or different. The volatile memory of the storage management device is stored with a cluster status indicator for each cluster. In one embodiment, the cluster status indicators can also be stored in the form of a bitmap like the chunk status indicators.

In one embodiment of the present disclosure, each cluster has a corresponding bit, indication in the cluster bitmap that indicates whether the corresponding cluster is assigned or not. For example, with 2 bits for indication, the following three states may be used:

Cluster status indicator 0, indicating that all chunks in the cluster are assigned with data and the cluster contains valid content. In such case, if the content in the cluster is to be read, there is no need to check the chunk indicator(s) in the chunk bitmap, and the data will be read naturally. In FIG. 5, an assigned cluster is represented by pattern 502.

Cluster status indicator 1, indicating that all chunks in the cluster are not assigned with data and no valid content is contained in the cluster. For a read request, a predefined response, such as all zeroed data, should be returned. In such case, there is no need to check the chunk indicator(s) in the chunk bitmap. In FIG. 5, an unassigned cluster is represented by pattern 504.

Cluster status indicator 2, indicating that the status of the cluster is unknown and the cluster comprises both the assigned chunk(s) and the unassigned chunk(s), i.e., storing valid content and invalid content both. In such case, for an I/O request, it is required to check the chunk indicator(s) in the chunk bitmap to determine status for particular chunk(s). In FIG. 5, a cluster in unknown status is represented by pattern 506.

As shown in FIG. 5, a plurality of chunks are aggregated into a cluster. The cluster status indicator of the corresponding cluster is determined based on the chunk status indicators. For example, a chunk 508, a chunk 510 and other chunks form the cluster 1, in which the chunk 508 is assigned and the chunk 510 is unassigned. The chunk indicators for these chunks are accordingly stored in a corresponding location in the bitmap, e.g. 504. Regardless of the status of other chunks in cluster 1, the status of cluster 1 is unknown. That is, the cluster status indicator 512 in the cluster bitmap indicates the status of cluster 1 as unknown. Chunk 514 and chunk 516 are both assigned and other chunks in the corresponding cluster N are also assigned: therefore, the status of cluster N is assigned, i.e., the cluster status indicator 518 in the cluster bitmap indicates the cluster N as assigned. The status of cluster 2 is unassigned because all chunks in cluster 2 are unassigned. In this way, if for example the capacity of the physical storage device 112 is 1 TB and the chunk size is 1 MB, then the cluster bitmap size is 1 KB. In addition, reading and writing performance of data is further optimized, reducing how often to access the physical storage device and prolonging service life of the storage device.

It should be noted that the cluster bitmap may be operated with write-through mode, such that the cluster bitmap (i.e., cluster status indicators) is not necessarily stored in the non-volatile memory. Also, consistency issue between the cluster bitmap and the chunk bitmap would not occur.

Figure 6:
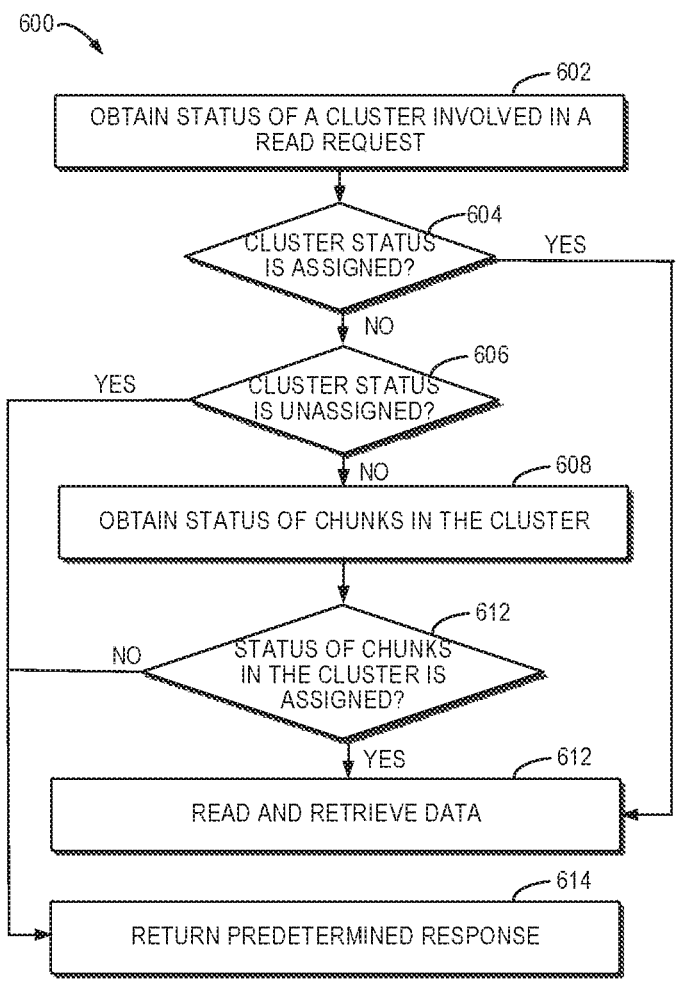
FIG. 6 demonstrates a flowchart of a read operation according to one embodiment of the present disclosure.

Now the process of operation 600 on a read request according to one embodiment of the present disclosure is described with reference to FIG. 6. FIG. 6 illustrates an operation of a cluster related to the read request, which operation can be executed at the storage management device 102. That is, in one embodiment, the method 600 may be to performed for each cluster related to the read request, so as to process the read request.

At 602, the status of the cluster in question is obtained. In this step, the cluster status is determined by obtaining the cluster status indicator stored in the volatile memory of the storage management device 102. As mentioned above, the cluster status indicator may indicate that the cluster is assigned, unassigned or the assignment status is unknown.

Next at 604, whether the cluster status indicator of the cluster indicates the cluster is assigned or not is determined. If the cluster is determined as assigned at 604, method 600 proceeds to 612, where the storage management device 102 may issue a read command to the physical storage device 112, such that the physical storage device 112 performs the read operation and returns data in the cluster associated with the read request.

On the other hand, if the status of the cluster is determined as being not assigned at 604, the method 600 proceeds to 606, where whether the status of the cluster is unassigned is determined. If the cluster status is unassigned, i.e., no valid content is contained in the corresponding storage region of the cluster, a predefined response, e.g., all zeroed data, regarding the read request is returned at 616.

If the cluster status is not determined as unassigned at 606, it means the assignment status of the cluster is unknown. At this time, the method 600 proceeds to 608, where the chunk status indicator(s) of chunk(s) in the cluster is obtained, in order to further determine the assignment status of the storage region related to the read request in the cluster. To facilitate describing the process, the operation on one chunk of the cluster is elaborated below. If the chunk of the cluster is determined as assigned at 610, the storage management device 102 issues a read command to the physical storage device 112, enabling the physical storage device 112 to perform read operation and return data in the chunk associated with read request. On the other hand, if the chunk in the cluster is determined as unassigned at 610, i.e., no valid content in the chunk, a predefined response for the read request, such as all zeroed data, is returned at 616.

It should be understood that data or predefined response returned in the above steps are for the data storage region related to the read request. Besides, it can also be appreciated that the read request may involve operation on data in a storage region comprising one or more chunks and one or more clusters. A read command is issued from the storage management device 102 to the physical storage device 112 based on the determination of the status of a plurality of clusters or chunks.

Figure 7:
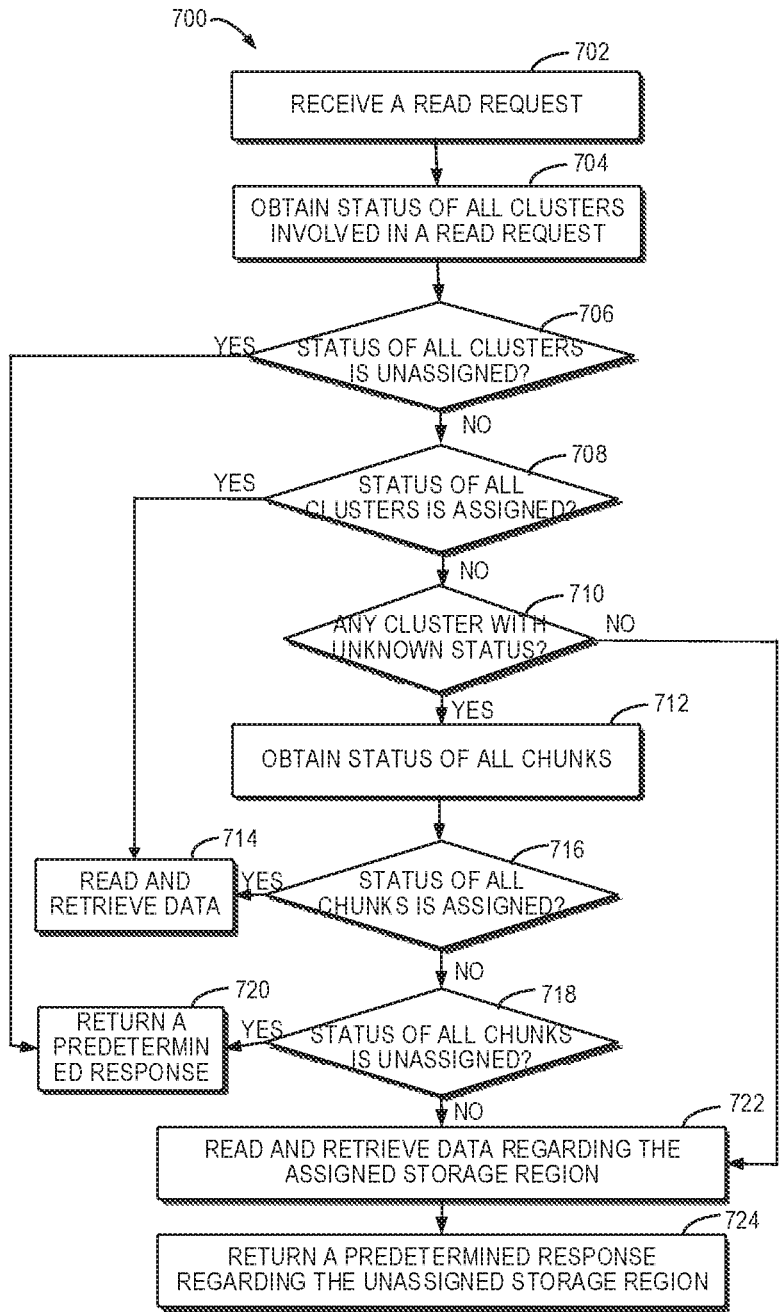
FIG. 7 demonstrates a flowchart of a read operation according to a further embodiment of the present disclosure.

FIG. 7 demonstrates the process of operation 700 on read request according to a further embodiment of the present disclosure. FIG. 7 illustrates an operation for a plurality of clusters related to the read request, which operation can be performed at the storage management device 102. For each specific cluster, the read operation may be performed according to the method 600 disclosed above.

At 702, a read request that at least indicates the storage region of the read data is received. At 704, status of all clusters related to the read request is obtained. In this step, the status of all clusters related to the read request may be determined by obtaining the cluster bitmap stored in the volatile memory of the storage management device 102. As stated above, the cluster status indicator may indicate that the cluster is assigned, unassigned or the assignment status is unknown.

Next, the read request is processed based on the cluster status indicators of all clusters related to the read request. At 706, if the status of all clusters related to the read request is determined as unassigned, proceed to 714. At this point, no valid content is contained in the storage regions corresponding to all clusters, so there is no need to issue an I/O command to read from the physical storage device 112. Instead, predefined data is filled and a predefined response regarding the read request is returned, e.g., all zeroed data. On the other hand, if it is determined that not all of the cluster status for the clusters related to the read request is unassigned at 706, the method 700 proceeds to 708, where it is determined whether status of all clusters related to the read request is assigned.

At 708, if the status of all clusters related to the read request is determined as assigned, the method proceeds to 714, where a read command is issued to the physical storage device 112, such that the physical storage device 112 performs read operation and returns data in the cluster associated with the read request. If not all of the cluster status for the clusters related to the read request is determined as unassigned at 708, it means that the read request involves unassigned and assigned clusters, or at least one cluster is in unknown status. Therefore, the method 700 may further determine which one of the two situations is the case at 710 and continue to process the read request.

If it is determined that the read request does not involve clusters of unknown status at 710, i.e., those clusters are either assigned cluster(s) or unassigned cluster(s), the method 700 proceeds to 722, where a read command is issued to the physical storage device 112, enabling the physical storage device 112 to perform read operation on the assigned data region related to the read request and the data associated with the read request is returned Further, the unassigned data region related to the read request is filled with predefined data and a predefined response is return, e.g., all zeroed data.

On the other hand, if the read request is determined to involve clusters of unknown status at 710, the method proceeds to 712, where status of all chunks related to the read request is obtained. In this step, the chunk bitmap stored in the metadata region of the physical storage device is obtained to determine status of all chunks related to the read request. Next, the read request is processed based on the chunk status indicators of all chunks related to the read request. The method 700 proceeds to 716 and 718, where the operations on all chunks are performed according to similar operations for clusters in 706 and 708, respectively. That is, if the status of all chunks related to the read request is determined as assigned at 716, the operation proceeds to 714 and a read command is issued to the physical storage device 112, enabling the physical storage device 112 to perform read operation and return data associated with the read request; if not all of the chunk status for the chunks related to the read request is determined as assigned at 716, the method proceeds to 718, where it is determined whether the status of all chunks are unassigned or not.

If the status of all chunks is determined as unassigned at 718, a predefined response for the read request is returned, e.g., all zeroed data, at 720. On the other hand, if not all chunks are determined as unassigned status at 718, it means that the read request involves unassigned and assigned chunks. The method 700 proceeds to 722, where a read operation is performed on the assigned data region related to the read request, and data associated with the read request is returned, and to 724, where the unassigned data region related to the read request is filled with predefined data and a predefined response is returned.

It should be understood that the above description is just a process of processing a read request according to one embodiment of the present disclosure and those skilled in the art can vary it without deviating from the concept of the present disclosure. For example, the step 710 or other decision steps may be omitted and the read request will be processed accordingly. For another example, only the clusters of status unknown are processed in 712, and the assigned and/or unassigned clusters are processed according to operations similar to 714 and 716 so as to return data in response to the read request.

It is seen from the above process that the storage management device 102 may process the read request based on the cluster status indicators and the chunk status indicators, returning for the read request data of a predefined response regarding the unassigned storage region and returning for the read request requested data regarding the assigned storage region, thereby eliminating the differences among operations of the storage devices provided by different vendors.

Figure 8:
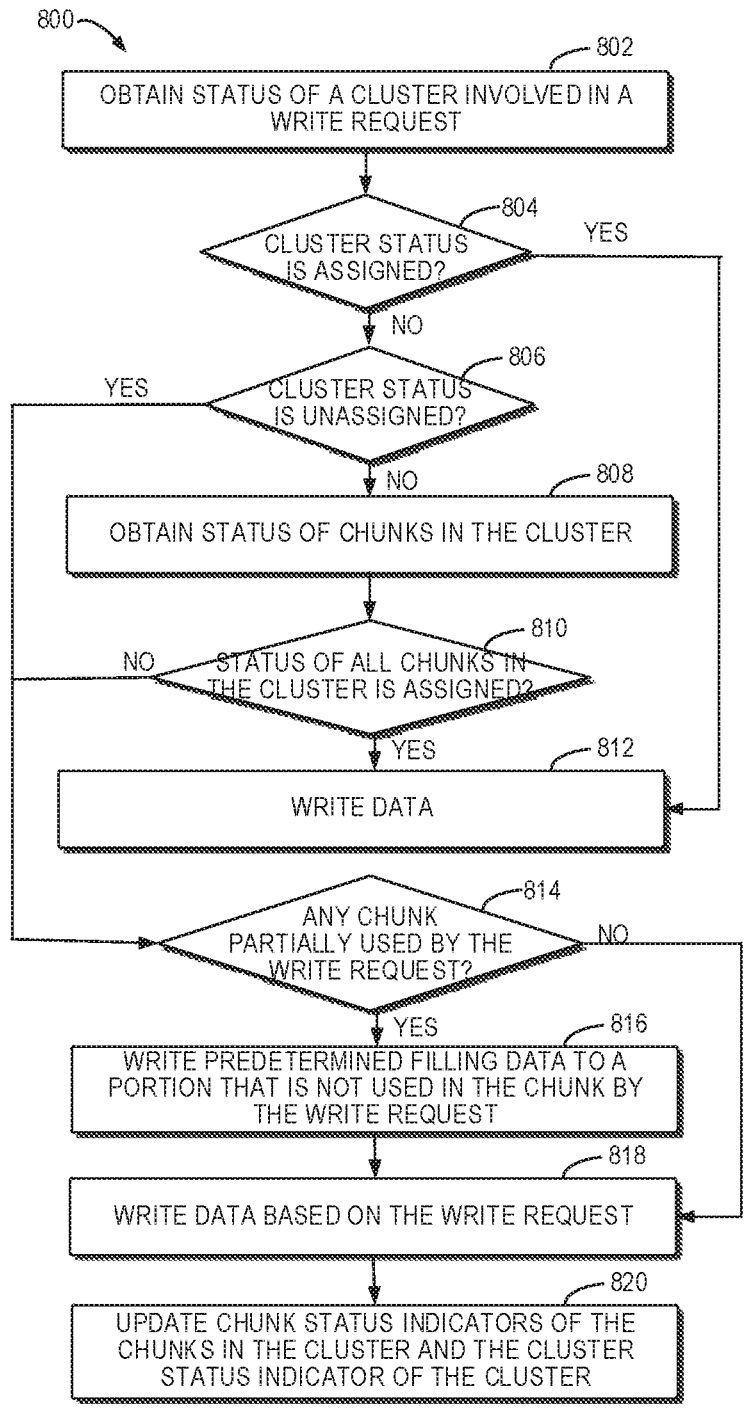
FIG. 8 demonstrates a flowchart of a write operation according to one embodiment of the present disclosure.

The process of operation 800 on write request according to one embodiment of the present disclosure will be described with reference to FIG. 8. FIG. 8 illustrates an operation of a cluster related to a write request, which operation can be performed at the storage management device 102. That is, in one embodiment, the method 800 may be performed for each cluster related to the write request, in order to process the write request.

At 802, status of a cluster in question is obtained. In this step, the cluster status is determined by obtaining the cluster status indicator stored in the volatile memory of the storage management device 102. As mentioned above, the cluster status indicator may indicate that the cluster is assigned, unassigned or the assignment status is unknown.

Next at 804, whether the cluster status indicator of the cluster indicates the cluster is assigned or not is determined. If the cluster is determined as assigned at 804, method 800 proceeds to 812, where the storage management device 102 may issue a write command to the physical storage device 112, such that the physical storage device 112 performs the write operation and writes the data associated with the write request in the cluster into the corresponding storage region of the cluster.

On the other hand, if the status of the cluster is determined as unassigned at 804, the method 800 proceeds to 806, where whether the cluster is unassigned or not is determined. If the cluster status is unassigned, no valid content is contained in the corresponding storage region of the cluster, the method 800 proceeds to 814, where it is determined whether the cluster involves chunks partially used by the write request. If yes, the write request is expanded and predefined filling data. e.g., all zeroed data, is written into the portion that is not used by the write request in this partially used chunk at 816, and a write command is issued to the physical storage device 112 at 818, writing into data according to the write request. The method 800 then proceeds to 820, where the chunk status indicators of the chunks in the cluster is updated as assigned and the cluster status indicator of the cluster is updated as unknown. If the cluster is determined to involve chunks not partially used by the write request at 814, step 816 may be skipped and the method 800 directly proceeds to 818 and 820 to perform write and update operations.

If the cluster status is determined not being as unassigned at 806, it means the assignment status of the cluster is unknown. At this point, the method 800 proceeds to 808, where the chunk status indicators of chunks in the cluster are obtained, in order to further determine the assignment status of the storage region in the cluster related to the write request. To facilitate describing, here the operation on one chunk of the cluster is elaborated. If the chunk of the cluster is determined as assigned at 810, the storage management device 102 issues a write command to the physical storage device 112, enabling the physical storage device 112 to perform write operation and write data associated with the write request in the cluster into the corresponding storage region of the cluster. On the other hand, if the chunk in the cluster is determined as unassigned at 810, i.e., no valid content in the chunk, the method 800 proceeds to 814, where the following steps are continued on the basis of whether the chunk is partially used by the write request, to complete write and update operations.

Figure 9:
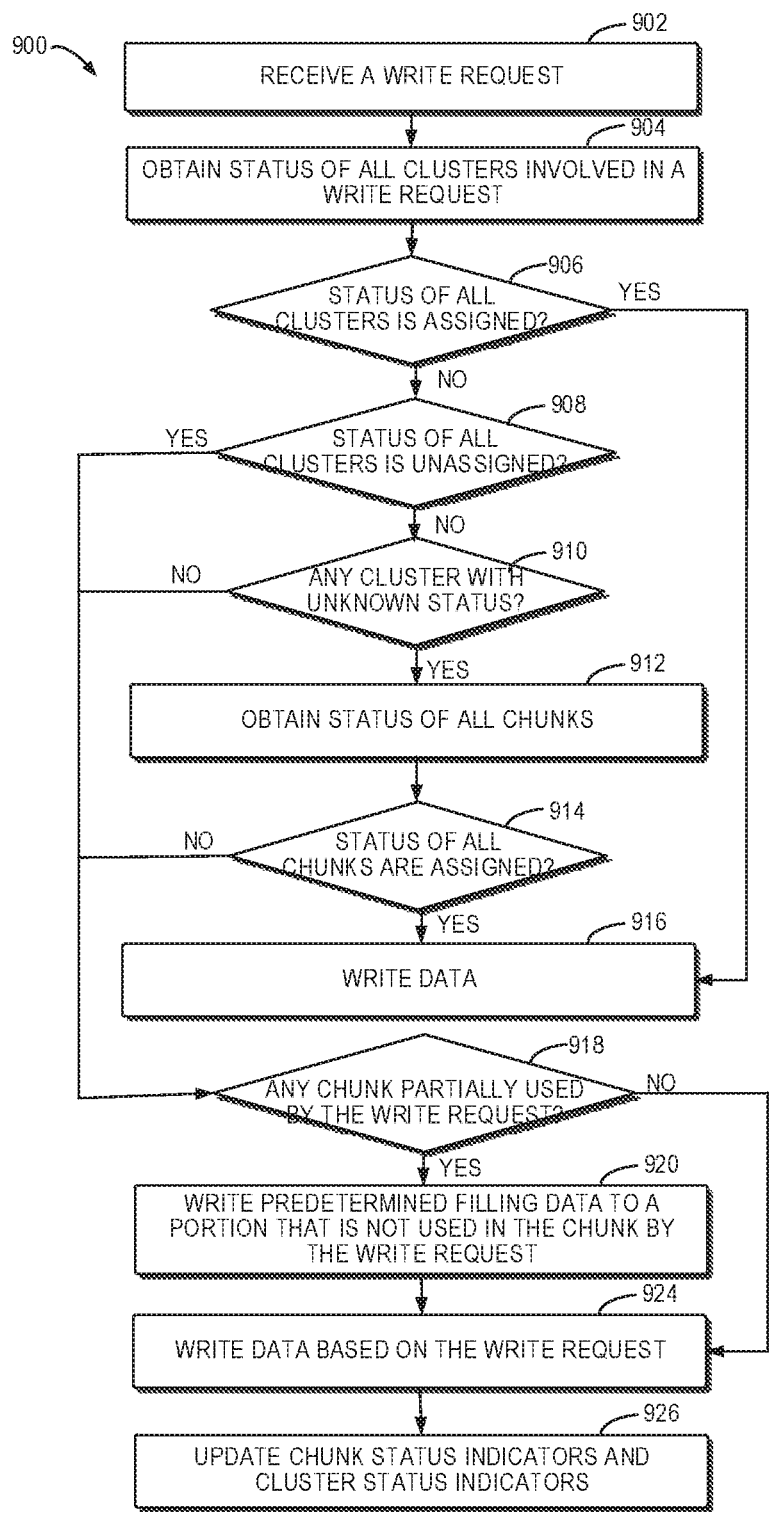
FIG. 9 demonstrates a flowchart of a write operation according to a further embodiment of the present disclosure.

It should be understood that the written data of the write request in the above steps are performed for the data storage region related to the write request. Additionally, it can also be appreciated that the write request may involve data operation including storage regions of one or more chunks and one or more clusters. The storage management device 102 may issue a write command to the physical storage device 112 based on the status of a plurality of clusters or chunks. FIG. 9 demonstrates the process of operation 900 for a write request according to a further embodiment of the present disclosure. FIG. 9 illustrates an operation for a plurality of clusters related to the write request, which operation can be performed at the storage management device 102. For each specific cluster, the write operation may be performed for example according to the method 800 disclosed above.

At 902, a write request is received. The write request at least indicates the storage region of the data to be written. At 904, status of all clusters related to the write request is obtained. In this step, the status of all clusters related to the write request is determined by obtaining the cluster bitmap stored in the volatile memory. At 906, the write request is processed based on the cluster status indicator of all clusters related to the write request. As stated above, a cluster status indicator may indicate that the cluster is assigned, unassigned or the assignment status is unknown.

Next, the write request is processed based on the cluster status indicators of all clusters related to the write request. At 906, if the status of all clusters related to the write request is determined as assigned, the method 900 proceeds to 916, where a write command is issued to the physical storage device 112, enabling the physical storage device 112 to perform a write operation and write data related to the write request in the cluster into the corresponding storage region of the cluster. On the other hand, if not all of the cluster status for the clusters related to the write request is determined as assigned at 906, the method 900 proceeds to 908, where it is determined whether the status of all clusters related to the write request is unassigned.

If the status of all clusters related to the write request is determined as unassigned at 908, i.e., no valid content in the corresponding storage regions of all clusters, the method proceeds to 918. The write request is then processed based on whether there are chunks partially used by the write request and the following steps 920, 924 and 926 are performed in a similar way as in steps 816 to 820 in the method 800. That is, if there is a chunk partially used by the write request, then the write request is expanded, predefined filling data, e.g., all zeroed data, is written into a portion in the partially used chunk that is not used by the write request; and a write command is issued to the physical storage device 112 to write data based on the write request. Afterwards, the chunk status indicator of the chunk in the cluster is updated as assigned and the cluster status indicator of the cluster as unknown. If there is, no chunk partially used by the write request, the write request does not need to be expanded, and the write and update operations are directly performed.

If not all of the cluster status for the clusters related to the write request is determined as unassigned at 908, it means that the write request involves unassigned and assigned clusters, or at least one cluster is in unknown status. Therefore, the method 900 at 910 will further determine which one of the two situations is the case and continue to process the write request.

If it is determined that the write request does not involve clusters of unknown status at 910, i.e., these clusters are either assigned cluster(s) or unassigned cluster(s), the method 900 proceeds to 918, where the write request is processed based on whether there is a chunk partially used by the write request, and the following operations for writing and updating the chunk status indicator and cluster status indicator are performed.

On the other hand, if the write request is determined as involving clusters of unknown status at 910, the method proceeds to 912, where status of all chunks related to the write request is obtained. In this step, the chunk bitmap stored in the metadata region of the physical storage device is obtained to determine status of all chunks related to the write request. Next, the write request is processed based on the chunk status indicators of all chunks related to the write request, and it is determined whether the status of all chunks are assigned at 914. If the status of all chunks is determined as assigned at 914, a write command is issued to the physical storage device 112, enabling the physical storage device 112 to perform write operation; if not all chunk status is determined as assigned at 914, i.e., at least one chunk is of unassigned status, the method proceeds to 918 to continue process the write request and finally complete the write and update operations.

Alternatively, when the write request is determined as involving assigned and unassigned clusters only without the presence of unknown clusters, operations similar to steps 916 and 918 are carried out to perform the write operation directly on the assigned clusters related to the write request and continue the following write and update operations on the unassigned clusters related to the write request based on whether there is a chunk partially used by the write request.

It should be understood that the above description is just a process of processing a write request according to one embodiment of the present disclosure and those skilled in the art can vary it without deviating from the inventive concept of the present disclosure. For example, the step 910 or other decision steps can be omitted and the write request will be processed accordingly.

It is seen from the above process that the storage management device 102 processes the write request based on the cluster status indicators and the chunk status indicators, writes the requested data and the predefined filling data, and update the chunk bitmap and the cluster bitmap, which ensures the consistency of data status and storage region status between the storage management device 102 and the storage device 106 and provides correct storage data processing for the host 104.

The present disclosure also supports the control operations of the storage device for the upper layer of the application, e.g., some storage protocol commands In one embodiment of the present disclosure, when the host deletes data for example, the storage release commands, such as UNMAP, are supported. Now the process of an operation method 1000 for the storage release request according to one embodiment of the present disclosure will be described with reference to FIG. 10.

Figure 10:
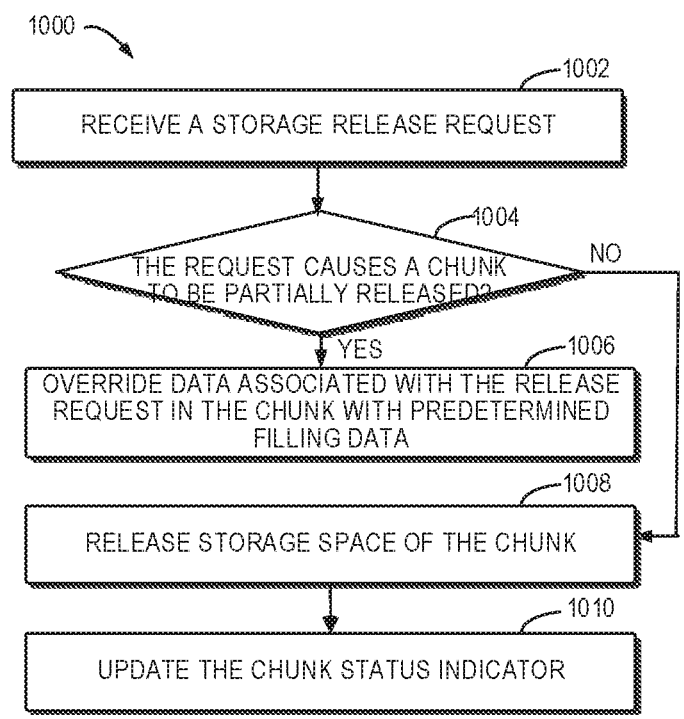
FIG. 10 demonstrates a flowchart of a storage release operation according to one embodiment of the present disclosure.

Because each storage release request may indicate a different storage space size, e.g., involving one or more chunks. It may also only require releasing a portion of each chunk. FIG. 10 illustrates an operation on one chunk related to a storage release request, which operation can be performed at the storage management device 102. That is, in one embodiment, the method 1000 may be performed for each chunk related to the storage release request so as to process the request.

According to the storage release request received at 1002, it is determined whether the storage release request causes a chunk to be partially used at 1004, i.e., whether only partial storage region in the chunk is required to be released. If the chunk is required to be partially released, the storage management device 102 may issue a write command to the physical storage device 112 at 1006, enabling the physical storage device to write the predefined data, such as zeroed data, into the portion of the chunk that is required to be released. In other words, data related to the release request in the chunk is overridden with predefined filling data in this step.

On the other hand, if it is determined that no chunk is required to be partially released at 1004, i.e., the whole chunk should be released, the method 1000 proceeds to 1008, where the storage management device 200 may issue a storage release command to the physical storage device 112, enabling the physical storage device 112 to perform storage release operation. Afterwards, the chunk status indicator of the chunk is configured or updated as unassigned at 1010.

Figure 11:
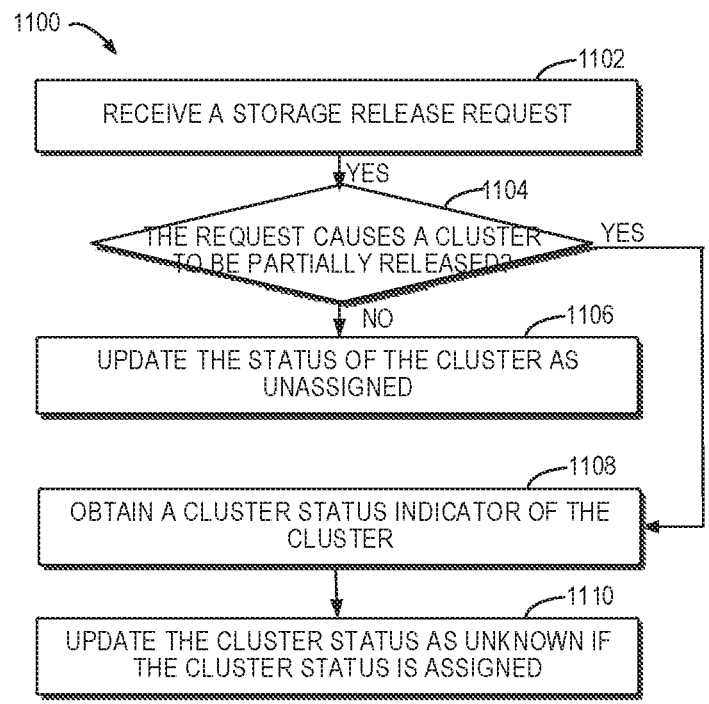
FIG. 11 demonstrates a flowchart of a storage release operation according to a further embodiment of the present disclosure.

Based on the received storage release request, similar operations may be performed for each chunk related to the storage release request following the process of method 1000, so as to complete processing the chunks related to the request and update status of the chunks. At this point, the action on the level of physical storage device is completed regarding the storage release request. Then, the cluster bitmap may be updated, so as to reflect the operation of storage release on the update of the cluster status. FIG. 11 illustrates an operation method 1100 for updating a cluster status indicator of the storage release request according to an embodiment of the present disclosure.

FIG. 11 illustrates an operation for one cluster related to the storage release request, which operation may be performed at the storage management device 102. That is, in one embodiment, the method 1100 may be performed for each cluster related to the storage release request to process the request.

According to the storage release request received at 1102, it is determined whether the storage release request causes the cluster to be partially used at 1104, i.e., whether only to partial storage region in the cluster is required to be released. If it is determined that the cluster is not required to be partial released, i.e., the whole cluster should be released, status of the cluster is updated as unassigned at 1106. On the other hand, if the cluster is required to be partially released at 1104, the method 1100 proceeds to 1108, where the cluster status indicator of the cluster is obtained. Besides, if the cluster status is determined as assigned at 1100, the status for the cluster is updated as unknown.

Similar operations may be performed for each cluster related to the storage release request following the process of method 1100, so as to complete updating status of the clusters related to the request. It should be understood that the cluster status (i.e., cluster bitmap) can be updated after completing the action on the level of physical storage device, or the cluster status indicator can be updated first based on the storage release request following the operation 1100 as illustrated in FIG. 11, or the above two can be performed simultaneously.

By employing the above storage release operation, the storage regions at different levels are consistently managed and the support for the same operation behaviors of the product of different vendors is provided.

Figure 12:
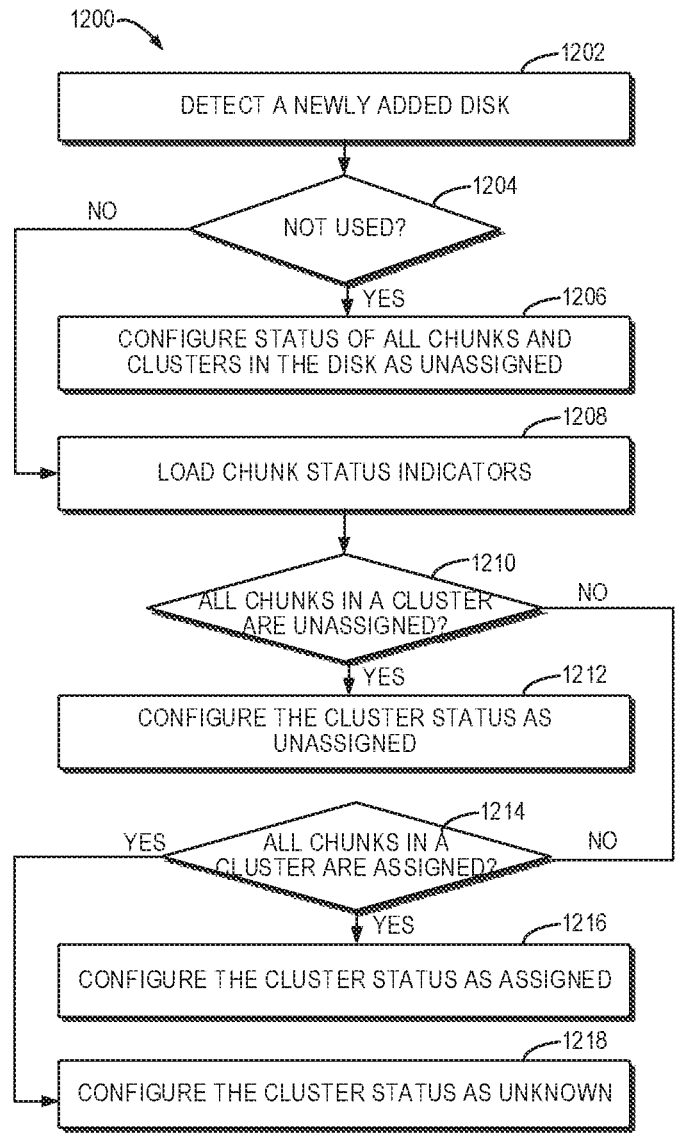
FIG. 12 demonstrates a flowchart of an initialization operation according to one embodiment of the present disclosure.

Furthermore, when a new physical storage device is added to the storage system or when the system is powered off, the bitmap in the volatile memory of the storage management device 102 should be updated. It should be appreciated that the physical storage device "coming online"

to the storage system, e.g. storage environment 100, is a physical storage device configured with data region and metadata region. FIG. 12 illustrates an initialization process 1200 in this case.

At 1202, a newly added physical storage device is detected and it is determined whether it is a brand-new one or a used one at 1204. If the physical storage device is a brand-new one, the status of all chunks and clusters therein is configured as unassigned at 1206. If the physical storage device is determined as a used one at 1204, the method loads cluster status indicators from the metadata region of the device at 1208, and performs following steps for each cluster.

At 1210, it is determined whether the chunk status of all chunks in the cluster are unassigned. If yes, the cluster status is configured as unassigned at 1212. If it is determined that not all of the chunk status for the chunks in the cluster are unassigned at 1210, it is determined whether all chunks in the cluster are assigned at 1214. If yes, the cluster status is configured as assigned; otherwise, the cluster status is configured as unknown. Therefore, the initialization process of the newly online physical storage device is completed.

Figure 13:
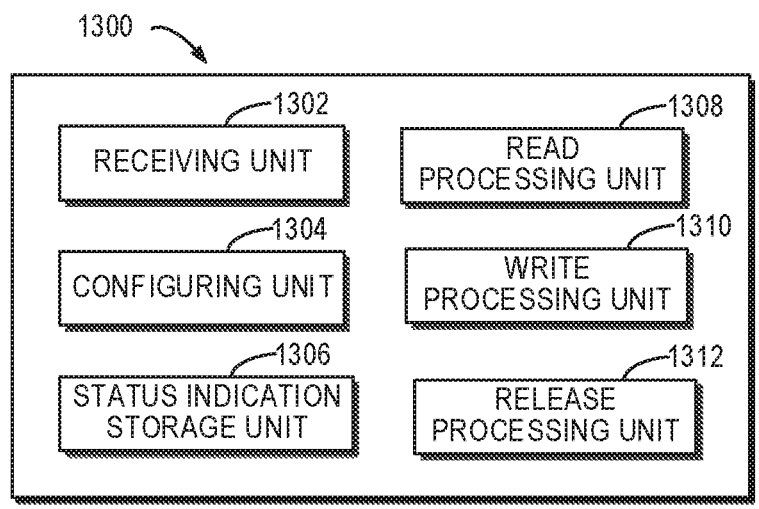
FIG. 13 illustrates, a schematic diagram of a storage management apparatus according to one embodiment of the present disclosure.

FIG. 13 illustrates a schematic diagram of an implementation for a storage management device 102 according to one embodiment of the present disclosure. The storage management device 102 comprises: a receiving unit 1302 configured to receive a configuration request for a storage space managed by the storage management device, the configuration request indicating a capacity of the storage space and a target size of a chunk in the storage space; and a configuration unit 1304 configured to divide, based on the capacity and the target size, the storage space into a metadata region storing a chunk status indicator indicating whether the chunk is assigned with data, and a data region including the chunk of the target size.

According to one embodiment of the present disclosure, the storage management device 102 further comprises a status indication storage unit 1306. The configuration unit 1304 is further configured to divide chunks in the storage space into a plurality of clusters: determine for each cluster a cluster status indicator indicating whether the cluster is assigned with data based on a chunk status indicator; and store the cluster status indicator in the status indication storage unit 1306.

According to one embodiment of the present disclosure the receiving unit 1302 of the storage management device 102 is further configured to receive a read request, a write request, a storage release request, etc., and operate its managed physical storage device.

According to one embodiment of the present disclosure, the storage management device 102 further comprises a read request processing unit 1308, which is configured to process the read, request based on a cluster status indicator of at least one cluster involved in the received read request.

According to one embodiment of the present disclosure, the read processing unit 1308 is further configured to obtain a cluster status indicator of a first cluster involved in the read request, and in response to the cluster status indicator of the first cluster indicating that the first cluster is assigned with data, retrieving data stored in the first cluster associated with the read request.

According to one embodiment of the present disclosure, the read processing unit 1308 is further configured to obtain a cluster status indicator of a second cluster involved in the read request, and, in response to the cluster status indicator of the second cluster indicating that the second cluster is not assigned with data, returning a predetermined response for the read request.

According to one embodiment of the present disclosure, the read processing unit 1308 is further configured to: obtain a cluster status indicator of a third cluster involved in the read request; and in response to the cluster status indicator of the third cluster indicating that a status of the third cluster is unknown, obtaining chunk status indicators of chunks in the third cluster.

According to one embodiment of the present disclosure, the read processing unit 1308 is further configured to retrieve data stored in the first chunk associated with the read request in response to a chunk status indicator of a first chunk in the third cluster indicating that the first chunk is assigned with data; and in response to a chunk status indicator of a second chunk in the third cluster indicating that the second chunk is not assigned with data, returning a predetermined response for the read request.

According to one embodiment of the present disclosure, the storage management device 102 further comprise a write request processing unit 1310, which is configured to process the write request based on the cluster status indicator of at least one cluster involved in the write request.

According to one embodiment of the present disclosure, the write processing unit 1310 is further configured to obtain a cluster status indicator of a fourth cluster involved in the write request; and in response to the cluster status indicator of the fourth cluster indicating that the fourth cluster is assigned with data, writing data associated with the write request to the fourth cluster.

According to one embodiment of the present disclosure, the write processing unit 1310 is further configured to obtain a cluster status indicator of a fifth cluster involved in the write request; write data associated with the write request to at least one chunk in the fifth cluster in response to the cluster status indicator of the fifth cluster indicating that the fifth cluster is not assigned with data; and update the cluster status indicator of the fifth cluster and a chunk status indicator of at least one chunk in the fifth cluster.

According to one embodiment of the present disclosure, the write processing unit 1310 is further configured to write predetermined filling data to a portion that is not to be used in the chunk by the write request in response to determining that at least one chunk includes a chunk to be partially used by the write request.

According to one embodiment of the present disclosure, the write processing unit 1310 is further configured to: obtain a cluster status indication of a sixth cluster involved in the write request; obtain chunk status indicators of chunks in the sixth cluster in response to the cluster status indicator of the sixth cluster indicating that the status of the sixth cluster is unknown; and process the write request based on the chunk status indicators of chunks in the sixth cluster.

According to one embodiment of the present disclosure, the write processing unit 1310 is further configured to write data associated with the write request to a third chunk in response to a chunk status indicator of a third chunk in the sixth cluster indicating that the third chunk is assigned with data; and in response to a chunk status indicator of a fourth chunk in the sixth cluster indicating that the fourth chunk is not assigned with data; write data associated with the write request to a fourth chunk and update the chunk status indicator of the fourth chunk and the cluster status indicator of the sixth cluster.

According to one embodiment of the present disclosure, the write processing unit 1310 is further configured to write predetermined filling data to a portion that is not to be used in the fourth chunk by the write request in response to determining that the fourth chunk is to be only partially used by the write request.

According to one embodiment of the present disclosure, the storage management device 102 further comprises a release request processing unit 1312, which is configured to override data associated with the release request in the fifth chunk with predetermined filling data in response to determining that the storage release request is to release only a portion of a fifth chunk in the plurality of chunks.

According to one embodiment of the present disclosure, the release request processing unit 1312 is further configured to in response to determining that the storage release request is to release only a part of the chunks in a seventh cluster of the plurality of the clusters, obtain a cluster status indicator of a seventh cluster; and update the cluster status indicator of the seventh cluster in response to the status indicator of the seventh cluster indicating that the seventh cluster is assigned with data.

Figure 14:
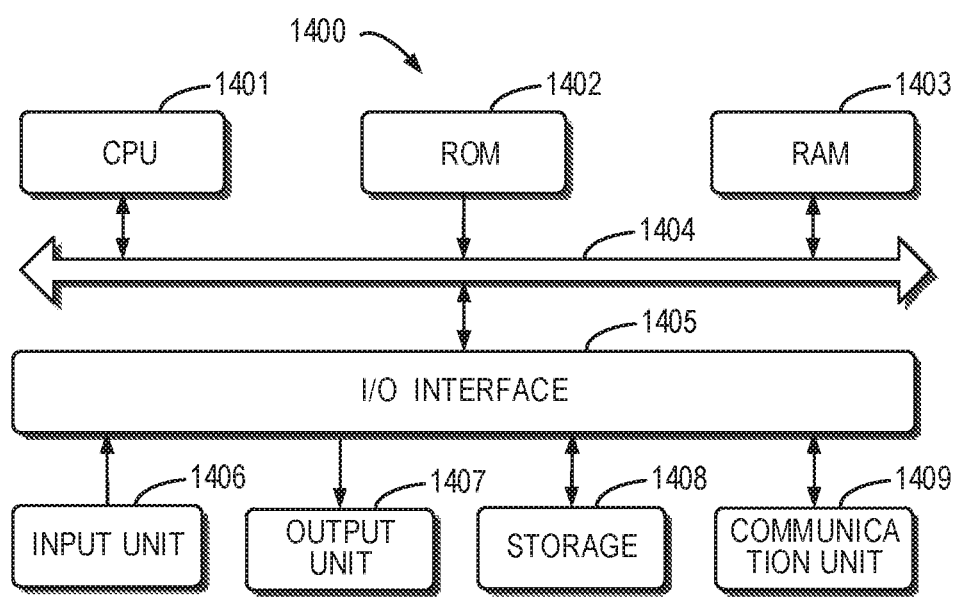
FIG. 14 illustrates a schematic diagram of a storage management device according to one embodiment of the present disclosure.

FIG. 14 illustrates a schematic diagram of a device 1400 for implementing embodiments of the present disclosure. The device 1400 can be implemented as a storage management device, such as the storage management device 102 as described above. As shown in FIG. 14, the device 1400 comprises a central processing unit (CPU) 1401, executing various appropriate actions and processing based on the computer program instructions stored in a read-only memory (ROM) 1402 or computer program instructions loaded from the storage unit 1408 to the random-access memory (RAM) 1403. Besides, various programs and data required for operating the device 1400 may be also stored in the RAM 1403. CPU 1401, ROM 1402 and RAM 1403 are connected with each other by a bus 1404 and an Input/Output (110) interface 1405 is also connected to the bus 1404.

A plurality of components in the device 1400 are connected to the I/O interface 1405, comprising: an input unit 1406, such as a keyboard and a mouse: an output unit 1407, such as displays and loudspeakers of various types; a storage unit 1408, such as disk and optical disk: and a communication unit 1409, such as a network interface card, a modem and a radio communication transceiver. The communication unit 1409 allows the device to exchange information/data with other devices via computer networks and/or all kinds of telecommunication networks, such as Internet.

In some embodiments, the processing unit 1401 can be configured to execute various procedures and processing described above, e.g., methods 200, 400, 600, 700, 800, 900, 1000, 1100 and 1200. For instance, in some embodiments, methods 200, 400, 600, 700, 800, 900, 1000, 1100 and 1200 can be implemented as a computer software program, which is tangibly included in a machine-readable medium, such as a storage 1408. In some embodiments, the computer program can be partially or completely loaded to and/or mounted on the device 1400 through ROM 1402 and/or communication unit 1409. When the computer program is loaded to the RAM 1403 and executed by CPU 1401, one or more steps of the methods 200, 400, 600, 700, 800, 900, 1000, 1100 and 1200 described above are implemented.

According to one embodiment of the present disclosure, there is also provided a storage management system comprising a storage management device provided according to the present disclosure and at least one physical storage device for storing data and forming a storage space.

According to one embodiment of the present disclosure, there is provided a computer-readable storage medium having computer-readable program instructions stored thereon. The computer-readable program instructions, when loaded into an apparatus, cause the apparatus to perform the methods 200, 400, 600, 700, 800, 900, 1000, 1100 and 1200 according to the present disclosure.

Based on the teachings offered by the above description and the related drawings, the modifications and other implementations of the present disclosure provided herein will become apparent for those skilled in the art. Therefore, it should be understood that embodiments of the present disclosure are not limited to the embodiments specifically described in the present disclosure and other modifications and implementations are also included in the scope of the present disclosure. Furthermore, although the above description and related drawings explain the exemplary embodiments in the context of certain combinations of components and/or functions, it should be noted that alternative embodiments can also provide different combinations of components and/or functions without deviating from the scope of the present disclosure. In this regard, other combinations of components and/or functions different from the above specified ones are also expected to fall within the scope of the present disclosure. Although specific technical terms are used here, they only convey general and descriptive meanings with no intention of putting limitations on the present disclosure.

We claim:

1. A method for storage management, comprising:
receiving, at a storage management device, a configuration request for a storage space managed by the storage management device, the configuration request indicating a capacity of the storage space and a target size of a chunk in the storage space;
dividing, based on the capacity and the target size, the storage space into a metadata region storing a chunk status indicator indicating whether the chunk is assigned with data and a data region including the chunk with the target size;
dividing a plurality of chunks in the storage space into a plurality of clusters of chunks, each of the plurality of clusters of chunks including two or more chunks among the plurality of chunks;
determining, for a first cluster among the plurality of clusters of chunks, a cluster status indicator indicating whether the first cluster is assigned with data based on chunk status indicators of the two or more chunks included in the first cluster;
receiving, at the storage management device, a write request involving the first cluster; and
processing the write request based on the cluster status indicator of the first cluster,
wherein the processing the write request comprises:
in response to the cluster status indicator of the first cluster indicating that the first cluster is not assigned with data, writing data associated with the write request to at least one first chunk included in the first cluster; and
updating the cluster status indicator of the first cluster and a chunk status indicator of the at least one first chunk included in the first cluster; and
wherein the writing data to at least one first chunk included in the first cluster comprises:
in response to determining that the at least one first chunk includes a respective chunk to be partially used by the write request, writing predetermined filling data to a portion that is not to be used in the respective chunk by the write request.

2. The method of claim 1, further comprising:
receiving, at the storage management device, a read request involving at least one cluster among the plurality of clusters of chunks; and
processing the read request based on a cluster status indicator of the at least one cluster involved in the read request.

3. The method of claim 2, wherein the at least one cluster includes a second cluster, and the processing the read request comprises:
obtaining a cluster status indicator of the second cluster involved in the read request; and
in response to the cluster status indicator of the second cluster indicating that the second cluster is assigned with data, retrieving data stored in the second cluster associated with the read request.

4. The method, of claim 2, wherein the at least one cluster includes a second cluster, and the processing the read request comprises:
obtaining a cluster status indicator of the second cluster involved in the read request; and
in response to the cluster status indicator of the second cluster indicating that the second cluster is not assigned with data, returning a predetermined response for the read request.

5. The method of claim 2, wherein the at least one cluster includes a second cluster, and the processing the read request comprises:
obtaining a cluster status indicator of the second cluster involved in the read request;
in response to the cluster status indicator of the second cluster indicating that a status of the second cluster is unknown, obtaining chunk status indicators of chunks in the second cluster; and
processing the read request based on the obtained chunk status indicators.

6. The method of claim 5, wherein the processing the read request based on the obtained chunk status indicators comprises:
in response to a chunk status indicator of a first chunk included in the second cluster indicating that the first chunk is assigned with data, retrieving data stored in the first chunk associated with the read request; and
in response to a chunk status indicator of a second chunk included in the second cluster indicating that the second chunk is not assigned with data, returning a predetermined response for the read request.

7. The method of claim 1, wherein the at least one cluster includes a second cluster, and the processing the write request comprises:
obtaining a cluster status indicator of the second cluster involved in the write request; and
in response to the cluster status indicator of the second cluster indicating that the second cluster is assigned with data, writing data associated with the write request to the second cluster.

8. The method of claim 1, wherein the at least one cluster includes a second cluster, and the processing the write request comprises:
obtaining a cluster status indication of the second cluster involved in the write request;
in response to the cluster status indicator of the second cluster indicating that a status of the second cluster is unknown, obtaining chunk status indicators of chunks in the second cluster; and
processing the write request based on the chunk status indicators of the chunks in the second cluster.

9. The method of claim 8, wherein the processing the write request based on the chunk status indicators of the chunks in the second cluster comprises:
in response to a chunk status indicator of a second chunk included in the second cluster indicating that the second chunk is assigned with data, writing data associated with the write request to the second chunk; and
in response to the chunk status indicator of a third chunk included in the second cluster indicating that the third chunk is not assigned with data, writing data associated with the write request to the third chunk; and
updating the chunk status indicator of the third chunk and the cluster status indicator of the second cluster.

10. The method of claim 9, wherein the writing data to the third chunk comprises:
in response to determining that the third chunk is to be only partially used by the write request, writing predetermined filling data to a portion that is not to be used in the third chunk by the write request.

11. A method for storage management, comprising:
receiving, at a storage management device, a configuration request for a storage space managed by the storage management device, the configuration request indicating a capacity of the storage space and a target size of a chunk in the storage space;
dividing, based on the capacity and the target size, the storage space into a metadata region storing a chunk status indicator indicating whether the chunk is assigned with data and a data region including the chunk with the target size;
dividing a plurality of chunks in the storage space into a plurality of clusters of chunks, each of the plurality of clusters of chunks including two or more chunks among the plurality of chunks;
determining, for a respective cluster among the plurality of clusters of chunks, a cluster status indicator indicating whether the respective cluster is assigned with data based on chunk status indicators of the two or more chunks included in the respective cluster;
receiving, at the storage management device, a storage release request; and
in response to determining that the storage release request is to release only a portion of a first chunk included in the plurality of chunks, overriding data associated with the release request in the first chunk with predetermined filling data.

12. A method for storage management, comprising:
receiving, at a storage management device, a configuration request for a storage space managed by the storage management device, the configuration request indicating a capacity of the storage space and a target size of a chunk in the storage space;
dividing, based on the capacity and the target size, the storage space into a metadata region storing a chunk status indicator indicating whether the chunk is assigned with data and a data region including the chunk with the target size;
dividing a plurality of chunks in the storage space into a plurality of clusters of chunks, each of the plurality of clusters of chunks including two or more chunks among the plurality of chunks;
determining, for a respective cluster among the plurality of clusters of chunks, a cluster status indicator indicating whether the respective cluster is assigned with data based on chunk status indicators of the two or more chunks included in the respective cluster;

receiving, at the storage management device, a storage release request;

in response to determining that the storage release request is to release one or more chunks in a first cluster of the plurality of clusters of chunks, obtaining a cluster status indicator of the first cluster; and in response to the status indicator of the first cluster indicating that the first cluster is assigned with data, updating the cluster status indicator of the first cluster.

13. An electronic device, comprising:

a processing unit; and a memory coupled to the processing unit and configured with processing unit to cause the electronic device to perform actions comprising:

receiving, at a storage management device, a configuration request for a storage space managed by the storage management device, the configuration request indicating a capacity of the storage space and a target size of a chunk in the storage space;

dividing, based on the capacity and the target size, the storage space into a metadata region storing a chunk status indicator indicating whether the chunk is assigned with data and a data region including the chunk with the target size;

dividing a plurality of chunks in the storage space into a plurality of clusters of chunks, each of the plurality of clusters of chunks including two or more chunks among the plurality of chunks;

determining, for a first cluster among the plurality of clusters of chunks, a cluster status indicator indicating whether the first cluster is assigned with data based on chunk status indicators of the two or more chunks included in the first cluster;

receiving, at the storage management device, a write request involving the first cluster; and processing the write request based on the cluster status indicator of the first cluster, wherein the processing the write request comprises:

in response to the cluster status indicator of the first cluster indicating that the first cluster is not assigned with data, writing data associated with the write request to at least one first chunk included in the first cluster; and updating the cluster status indicator of the first cluster and a chunk status indicator of the at least one first chunk included in the first cluster; and wherein the writing data to at least one first chunk included in the first cluster comprises:

in response to determining that the at least one first chunk includes a respective chunk to be partially used by the write request, writing predetermined filling data to a portion that is not to be used in the respective chunk by the write request.

14. The device of claim 13, the actions further comprising:

receiving, at the storage management device, a read request involving at least one cluster among the plurality of clusters of chunks; and processing the read request based on a cluster status indicator of the at least one cluster involved in the read request.

15. The device of claim 14, wherein the at least one cluster includes a second cluster, and the processing the read request comprises:

obtaining a cluster status indicator of the second cluster involved in the read request; and in response to the cluster status indicator of the second cluster indicating that the second cluster is assigned with data, retrieving data stored in the second cluster associated with the read request.

16. The method of claim 1, further comprising:

storing, in the metadata region in the form of a chunk bitmap, the chunk status indicators of the two or more chunks included in the first cluster.

17. The method of claim 16, further comprising:

storing, in the metadata region in the form of a cluster bitmap, the cluster status indicator of the first cluster.

* * * * *